United States Patent
Roosli et al.

(10) Patent No.: US 10,608,421 B2
(45) Date of Patent: Mar. 31, 2020

(54) SEPARABLE WALLBOX DEVICE AND MEMORY

(71) Applicant: Honeywell International Inc., Morris Plains, NJ (US)

(72) Inventors: Philipp Roosli, Niantic, CT (US); Ryan Gardner, Niantic, CT (US); Ravi Sagar, East Lyme, CT (US); Brendan Donecker, East Haddam, CT (US); Tom Woodruff, East Lyme, CT (US)

(73) Assignee: Honeywell International Inc., Morris Plains, NJ (US)

( * ) Notice: Subject to any disclaimer, the term of this patent is extended or adjusted under 35 U.S.C. 154(b) by 221 days.

(21) Appl. No.: 15/677,900

(22) Filed: Aug. 15, 2017

(65) Prior Publication Data

US 2017/0365989 A1    Dec. 21, 2017

Related U.S. Application Data

(63) Continuation of application No. 14/334,543, filed on Jul. 17, 2014, now Pat. No. 9,768,599.

(51) Int. Cl.
*H02G 3/08* (2006.01)
*H02G 3/12* (2006.01)
*H02G 3/14* (2006.01)

(52) U.S. Cl.
CPC .............. *H02G 3/081* (2013.01); *H02G 3/12* (2013.01); *H02G 3/14* (2013.01)

(58) Field of Classification Search
CPC ............. H02G 3/081; H02G 3/14; H02G 3/12
See application file for complete search history.

(56) References Cited

U.S. PATENT DOCUMENTS

| 5,637,930 A | 6/1997 | Rowen et al. |
| 7,400,239 B2 | 7/2008 | Kiko et al. |
| 8,145,897 B2 | 3/2012 | Brickell et al. |

(Continued)

FOREIGN PATENT DOCUMENTS

CN    101180608 A    5/2008

OTHER PUBLICATIONS

Infineon, "TPM Key Backup and Recovery for Trusted Platforms," pp. 1-17, Sep. 21, 2006.

*Primary Examiner* — Alfonso Perez Borroto
*Assistant Examiner* — Esayas G Yeshaw
(74) *Attorney, Agent, or Firm* — Seager, Tufte & Wickhem LLP

(57) ABSTRACT

A frame or the like incorporating a removable device for placement on a wallbox. The frame may be attached to a conventional wallbox without modification to the wallbox. The device may be mounted to, in or on the frame. A memory for the device may be situated on or embedded in the frame. If the device fails, it may be easily removed from the frame and replaced with a new or other working device without frame removal from the wallbox. The replacement device may be configured with information in the memory that contained the configuration for the failed device. The memory or the frame holding it may also be replaced if it fails; however, memory failure is rare compared to device failure. Thus, expense may be spared with just a replacement device and an available configuration in the remaining memory. The memory may have a secure trusted platform.

20 Claims, 3 Drawing Sheets

(56) References Cited

U.S. PATENT DOCUMENTS

| | | |
|---|---|---|
| 8,364,319 B2 | 1/2013 | Roosli |
| 8,497,424 B2 | 7/2013 | Castaldo |
| 8,525,372 B2 * | 9/2013 | Huang ................. H01H 9/0271 200/329 |
| 9,768,599 B2 | 9/2017 | Roosli et al. |
| 2002/0060530 A1 | 5/2002 | Sembhi et al. |
| 2003/0020121 A1 | 1/2003 | Rockwell et al. |
| 2005/0114234 A1 | 5/2005 | Thomas et al. |
| 2007/0051529 A1 | 3/2007 | Soccoli et al. |
| 2013/0214609 A1 | 8/2013 | Carmen, Jr. |
| 2013/0257315 A1 | 10/2013 | Restrepo et al. |
| 2014/0062659 A1 | 3/2014 | Roosli et al. |
| 2014/0190679 A1 | 7/2014 | Roosli et al. |
| 2014/0222367 A1 * | 8/2014 | Huppi ..................... G01K 1/16 702/135 |

* cited by examiner

SEPARABLE WALLBOX DEVICE AND MEMORY

This application is a continuation of U.S. patent application Ser. No. 14/334,543, filed Jul. 17, 2014. U.S. patent application Ser. No. 14/334,543, filed Jul. 17, 2014, is hereby incorporated by reference.

BACKGROUND

The present disclosure pertains to wallboxes and devices situated on wallboxes.

SUMMARY

The disclosure reveals a plate, ring, frame or the like and a device such as a thermostat, lighting control or other device for placement in a conventional wallbox available commercially presently or at a previous time. The frame, for instance, may be attached to the wallbox without modification to the wallbox. A device may be mounted to, in or on the frame. A memory for the device may be situated on or embedded in the frame. If the device fails, it may be easily removed from the frame and replaced with a new or other working device without frame removal. The replacement device may be configured with information in the memory that was of the configuration for the failed device. The memory may also be replaced if it fails; however, memory failure is rare compared to device failure. So expense may be spared with just device replacement and with a configuration of the replacement device being available from the memory still at the frame. The memory may also incorporate a trusted platform module that holds information, in a relatively secure manner. Older wallboxes in existing hotels, motels, industrial buildings, residences, and so on, may utilize the present system of a device and frame having the memory without modification of the wallboxes. New construction may use the cheaper conventional boxes which can incorporate the present system of the device and frame with memory.

DESCRIPTION

The description may provide one or more illustrative and specific examples or ways of implementing the present system and approach. There may be numerous other examples or ways of implementing the system and approach. Implementation may incorporate processors, user interfaces, and other hardware.

Electronic devices such as switches, thermostats, or other devices may contain a large number of configuration settings. Basic settings, such as timing of actions, allowable target temperature range, energy conservation settings and schedules may be augmented with communication settings such as network addressing configurations, device and location identifiers and network security settings. When such a switch, thermostat or other device has a failure and needs to be replaced, the device may be removed from the wallbox and replaced with a spare or replacement device. If the wallbox is customized for the switch, thermostat or other device, it may also have to be replaced. Unfortunately, the replacement operation may include removing an entire assembly or unit having a broken device, and further the replacement or spare device, incorporated in an entire assembly or unit, should be or may have to, for instance, be configured from scratch or start. The configuring may involve a significant effort and amount of time. Another drawback may be that the person replacing the device often has incomplete or merely old information available when attempting to configure the spare device. Inadequate configuring may often lead to inconsistent setup configurations such that system performance of the spare device is poor or deteriorates, and may lead to another needed replacement task. The inadequate configuring may become particularly cumbersome when the device has application-level bindings to other devices within its scope to perform a specific application, such as having to know which external motion detector has an impact on determining the occupancy of the space controlled by the device. Normal failure modes of devices may incorporate defects of power supply components, load actuating parts (e.g., relays, transistors, and triacs) or user interface components such as a keypad or display. Rarely does one observe a defect of a memory chip or storage memory that contains the configuration settings. If a defective device is removed, very often a very valuable and nondefective memory module in the unit may be simultaneously removed as well. In sum, a limitation of a conventional approach appears when a memory is part of the device.

Figure 1:
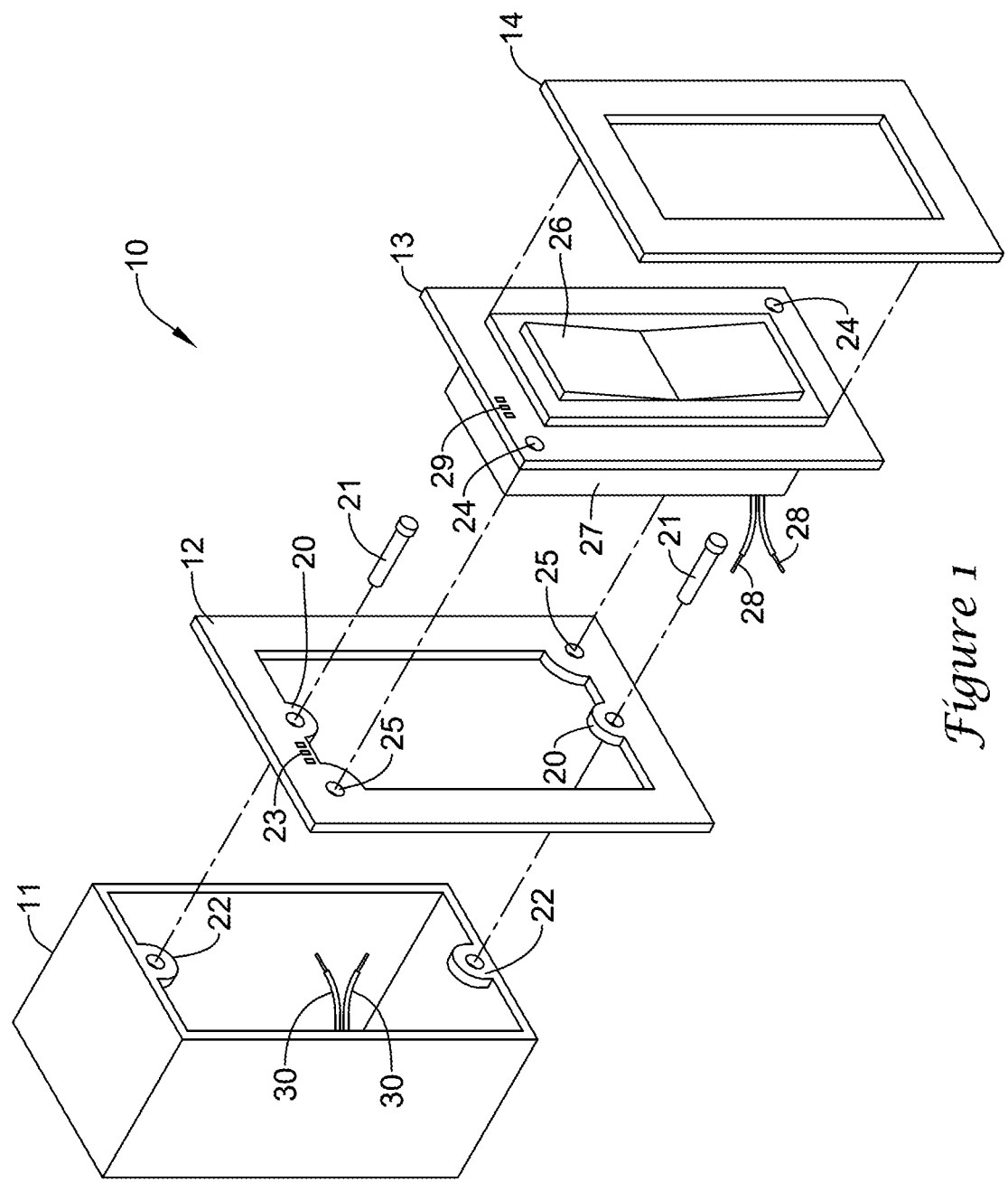
FIG. 1 is a diagram of a disassembled view of a conventional wallbox containing a present arrangement incorporating a plate or frame with a memory and an electronic or electrical device such as a switch that mounts on the frame.

FIG. 1 is a diagram of a disassembled view of a wall-mounted electronic or electrical component such as a switch. The diagram may refer to an arrangement 10. A wallbox 11 may be a conventional wallbox available commercially at a present or previous time. Wallbox 11 may be inserted in or attached to a wall of a space or room. The wallbox may be one existing in a building, or a one of new or planned construction. Due to volume and lack of complexity, such wallbox may be inexpensive compared to a wallbox modified to incorporate the advantages of the present arrangement. Without modification of the wallbox, a mounting frame 12 may be attached to wallbox 11. Fasteners such as screws 21 may hold mounting frame 12 through holes of frame tabs 20 onto threaded holes in tabs 22 already existing on wallbox 11. A memory chip 23 may be embedded in or in some other fashion be on the mounting frame 12. Mounting frame 12 may instead be a plate, ring, or some other structure for having or holding a memory of virtually any kind. A mounting plate 12 may be utilized as an illustrative example in the present arrangement.

A device 13 may be attached to mounting plate 12 with fasteners 24 or other technique that may connect to holding components 25 of the mounting plate. Fasteners 24 and components 25 may be selected from a group consisting of snap-on mechanisms, screws, pins, pegs, Velcro™, glue, removable adhesive substances, and so forth. Device 13 may incorporate a switch 26 which may have electronics for translating mechanical movement of switch 26 into an electrical closure or opening of a circuit. Device 13 may contain electronics in an enclosure 27 to which switch 26 is connected. One or more wires 28 may be connected to the electronics in enclosure 27 to wires 30 or electrical connections or connectors in wallbox 11. Wires 28 may be connected to power and signal carrying lines to and from enclosure 27 electronics. Wires 28 and 30 may be connected with an easy connect and release plug and receptacle assemblies, that may be connected to the wires and be connected or disconnected manually or automatically when the wallbox device is attached or removed. Other approaches may be used for connections.

A cover plate 14 may have a snap-on mechanism for attachment to wallbox device 13. Other fastening mechanisms may be selected for attaching cover plate 14 to wallbox device 13.

Device 13 may have contacts 29 for accessing memory chip 23. Memory chip 23 mat be one example as other kinds of storage may be utilized in the present arrangement. Contacts 29 may be connected to the enclosure 27 electronics which accesses memory chip 23 via contacts 29. Contacts 29 may be an illustrative example as other wire and wireless connections may be incorporated between the device 13 and memory 23.

A receptacle may be mounted in wallbox 11 and a plug may be mounted on wallbox device 13 or mounting frame 12. A plug connected to wires 28 may be attached to wallbox device 13 or mounting frame 12 and a receptacle connected to wires 30 and attached to wallbox 11. Another approach may be to have contacts for connection between mounting plate 12 or wallbox device 13, and wallbox 11. Perhaps it may be provided that none of wires 28 and 30 is not subject to carrying high voltage.

Figure 2:
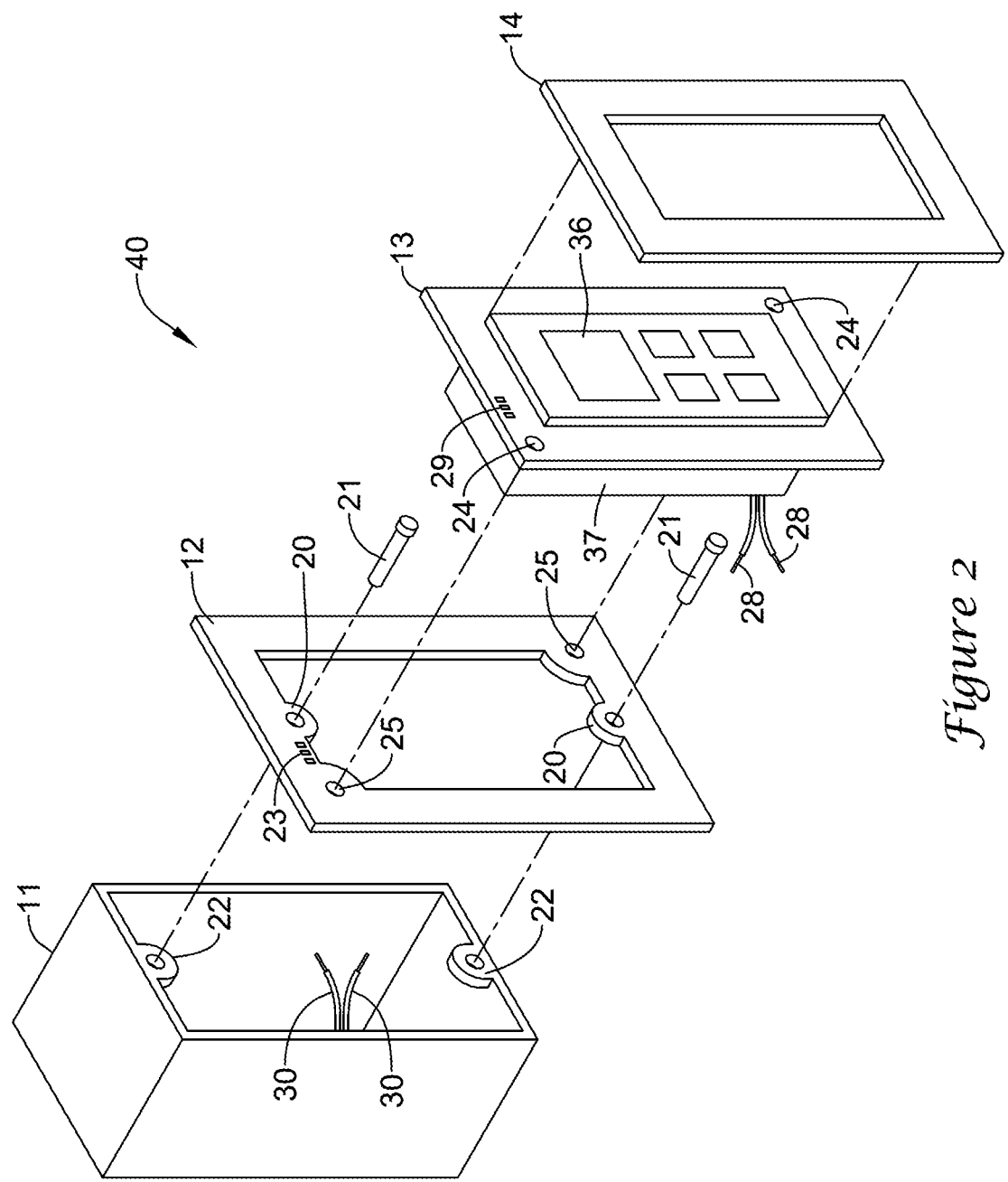
FIG. 2 is a diagram of the wallbox of FIG. 1 with the arrangement containing a thermostat in lieu of the switch.

FIG. 2 is a diagram of a disassembled view of an arrangement 40 that appears similar to arrangement 10 of FIG. 1. One difference is that in lieu of an example switch 26 and switch electronics in enclosure 27, there may be a thermostat 36 and associated electronics in an enclosure 37. There may be still may be another kind of mechanism and/or electronics instead of switch 16 or thermostat 36 as part of device 13 and an enclosure in lieu of enclosure 27 or 37.

Embedded memory chip 23 in mounting frame 12 and contacts 29 in wallbox device 13 may be for access by the mechanism and mechanism electronics in the enclosure situated in wallbox device 13.

As noted herein, one advantage of the present arrangements 10 and 40, is that if switch 26, thermostat 36, or other mechanism in wallbox device 13, fails, then one merely removes the snap-on cover plate 14, disconnects the wires or a plug-receptacle combination, and removes wallbox device 13 and replaces it with another wallbox device that should satisfactorily perform the functions of the previous wallbox device. Memory chip 23 or other kind of memory, still part of plate 12 in the arrangement, may be accessible by the mechanism of the replacement device 13 via contacts 29 or other kind of connection. Memory chip 23 or other memory may contain a configuration that was used for the replaced device 13 or mechanism and can be used for configuring the replacement device 13 or mechanism of wallbox arrangement 10 or 40, as noted herein.

Figure 3:
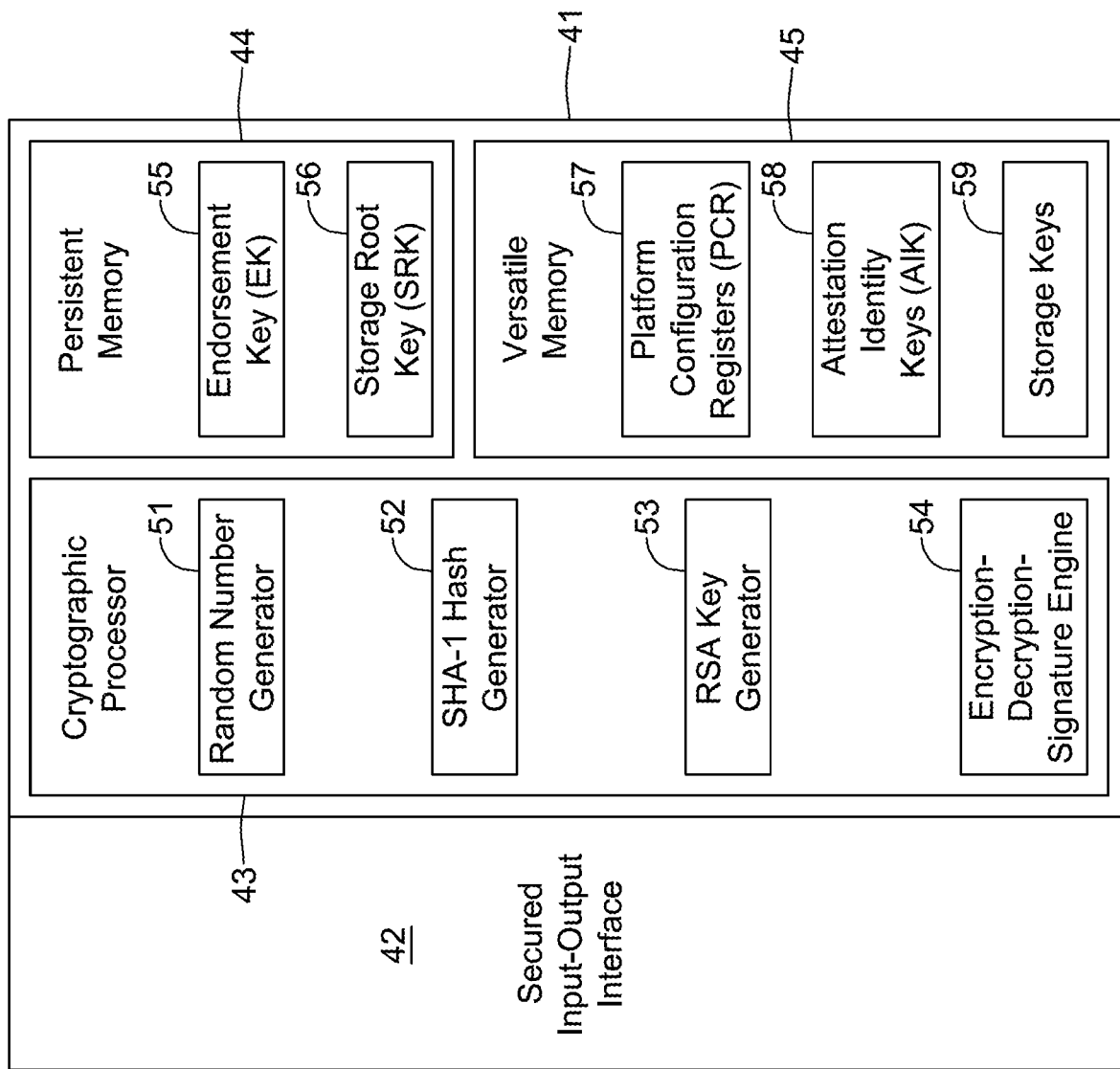
FIG. 3 is a diagram of a trusted platform module that may be incorporated in a memory of the present arrangement.

FIG. 3 is a diagram of a trusted platform memory having an arrangement 41. Embedded memory chip 23 or other memory may incorporate arrangement 41. A secured input-output interface 42 may have connections to contacts 29 or other connecting mechanism in device 13. Arrangement 41 may be that of the trusted platform module (TPM). Primary components of arrangement 41 may incorporate a cryptographic processor 43, a persistent memory 44 and a versatile memory 45.

Cryptographic processor 43 may incorporate a random number generator 51, a SHA-1 hash generator 52, an RSA key generator 53, and an encryption-decryption-signature engine 54. Persistent memory 44 may incorporate an endorsement key (EK) 55, and a storage root key 56. Versatile memory 45 may incorporate platform configuration registers (PCR) 57, attestation identity keys (AIK) 58, and storage keys 59.

The present approach may incorporate a locating of the memory chip 23 or other storage memory with a configuration of device 13 in mounting frame or plate 12. A connection between memory chip 23 in mounting frame 12 and device 13 may be created. Virtually all configuration settings applicable to device 13 may be stored in memory chip 23 or other memory that is part of mounting frame 12. Should now a failure occur as to device 13, then device 13 may be removed from mounting frame 12 and replaced with a replacement device 13 which is a good working spare part. As the replacement device 13 is attached to mounting frame 12, it may be reconnected with memory chip 23 or corresponding memory on mounting frame 12, and the replacement device 13 can virtually in an instant inherit the configuration settings from memory chip 23 or other memory previously connected to the replaced wallbox device 13. For instance, in arrangement 10 or 40, having memory chip 23 remain on mounting frame or plate 12 may ease replacement of a significant number of wallbox devices that could fail on a regular basis in a many-room facility or numerous individual places.

Mounting frame 12 holding memory chip 23 may be installed after the basic electrical plumbing has been installed in a wallbox 11. Mounting frame 12 may be distinct and separable from wallbox 11. Standard wallboxes 11, whether single or multiple gang, may be installed in a normal fashion without regard to the present arrangement 10, 40 or other like arrangement.

An implementation of memory chip 23 or other memory, in a plate or mounting frame 12, may be a particular portion or category of a memory chip or other storage that is referred to as a trusted platform module (TPM). The TPM may be regarded as a having a dedicated microprocessor designed to secure hardware by integrating cryptographic keys into devices. The TPM may allow for more secure storage of configuration settings, in particular, network encryption keys and/or authentication information. For example, when a spare or replacement wallbox device 13 is attached to mounting frame 12 and goes online, device 13 may announce itself to the network with a default network key to request permission to join the network. Then another network member or server may send a challenge to the spare or replacement wallbox device 13 that can only be properly met through accessing the TPM. The TPM may, for example, contain a one-way-hash function, e.g., based on the SHA-1 (secure hash algorithm), that can be utilized to compute a reply to the challenge.

In summary, memory chip 23 in mounting frame 12 may store energy management settings, network configuration settings and application-level settings that allow wallbox device 13 to participate meaningfully in an overall building automation application.

The wallbox device 13 and mounting frame 12 of arrangement 10, 40 or the like, may be used in residential, multi-dwelling and hotel applications. The present arrangement or system may allow existing installations to have replacement wallbox devices 13 with a higher degree of configuration accuracy and consistency than installations that had replacement devices incorporating configuration memory chips or storage in the devices themselves.

In the present device 13 and mounting frame 12 of system or arrangement 10 or 40, memory chip 23 may be embedded onto plate or mounting frame 12 that may be at least in part a printed circuit board (PCB) that has contacts at its end exposed towards device 13 having aligned contacts inserted or to be inserted in mounting frame 12. The PCB may be part of mounting frame 12. The plate or mounting frame 12 may be a molded ABS (acrylonitrile-butadiene-styrene) part where the PCB can be over-molded or otherwise affixed to the mounting frame. When wallbox device 13 is attached to plate or frame 12, the contacts of the plate or frame 12 may make a connection between a micro controller of wallbox device 13 and memory chip 23 of mounting plate or frame 12.

For example, exposed pads or contacts 29 on wallbox device 13 may match up with pogo-pins connected to memory chip 23 of mounting frame 12 in that when attached to mounting frame 12, an electrical contact may be established between wallbox device 13 and memory chip 23 of mounting frame 12. Alternatively, the pogo-pins may be on wallbox device 13 and make contact with exposed pads connected to memory chip 23 in mounting frame 12.

Other alternative approaches for connections may have an RFID-based or near field communication (NFC) memory chip 23 that is affixed to or embedded in plate or mounting frame 12. A reader for memory chip 23 may reside on wallbox device 13.

To recap, a wallbox system may incorporate a wallbox device having a user interface, a processor connected to the user interface, and may incorporate a mounting frame with a memory having configuration settings for the wallbox device. The mounting frame may be attachable to and removable from a commercially present or available standard or conventional wallbox without modification of the wallbox. The wallbox device may be attached to the mounting frame and connected to the memory. The wallbox device may be detached from the mounting frame and disconnected from the memory. When the wallbox device is detached from the mounting frame and disconnected from the memory, then another wallbox device may be attached to the mounting frame and connected to the memory. The configuration settings stored in the memory may be applicable to the other wallbox device.

The memory may incorporate a trusted platform module that allows for secure storage of configuration settings that incorporate particular encryption keys and/or authentication information.

The wallbox device may incorporate one or more items selected from a group consisting of a switch, a timer, a motion detector, an ambient object detector, a sound detector, a two-way communicator, an alert indicator, an air quality detector, an intrusion detector, an annunciator, diagnostic electronics, and a thermostat.

The memory further may have energy management settings and network configuration settings.

The memory may further have application-level settings which allow the wallbox device to participate in an overall building automation control.

A connection may occur between the wallbox device and the mounting frame having contacts connected to the memory and exposed towards contacts of the wallbox device with contact between the contacts of the mounting frame and the contacts of the wallbox device.

A connection between the wallbox device and the memory of the mounting frame may incorporate exposed metal connection pads on a printed circuit board holding the memory, and the wallbox device may incorporate pogo pins to establish contact with the pads when the wallbox device is attached to the mounting frame.

A connection between the wallbox device and the memory of the mounting frame may incorporate a wireless transmitter and a reader.

The trusted platform module may provide for secure storage of various settings besides configuration settings. When the other wallbox device is mounted to the mounting frame and connected to the memory, the other wallbox device may announce itself to a network with a default key to request permission to join the network. A network member or server may send a challenge to the other wallbox device that is or needs to be met through accessing the trusted platform module. The trusted platform module may contain a hash function that computes a reply to the challenge. If there is lack of a challenge or there is an acceptable reply to the challenge, then the other wallbox device may become a network member.

A wallbox arrangement may incorporate a mounting frame attachable to a conventional or standard electrical wallbox commercially available or already installed in a building, without modification of a structure of the wallbox, a memory attached to the mounting frame, and a wallbox device attachable to and detachable from the mounting frame, and connectable to and dis-connectable from the memory, respectively. The wallbox device may be replaceable with another similar wallbox device that is attachable to the mounting frame and connectable to the memory in a similar manner as the replaced wallbox device.

The arrangement may further incorporate a user interface situated within the wallbox device, and a processor situated within the wallbox device, connected to the user interface, and connectable to the memory. The wallbox device, along with the user interface and processor, may be replaceable with another wallbox device with a user interface and processor. Configuration settings held by the memory may be applicable for the processor and user interface of the replaced wallbox device and the other wallbox device. A connection, between the processor of the wallbox device and the memory, may incorporate contacts on the memory and on the processor of the wallbox device.

The memory may incorporate a trusted platform sub-module. The trusted platform sub-module may securely hold configuration settings for the processor and user interface. The trusted platform module may store security configuration settings incorporate network encryption keys and/or authentication information.

A connection between the memory and the processor may be selected from a group consisting of near field communication (NFC), infrared communication, and optical fiber communication.

The wallbox device may incorporate one or more items selected from a group consisting of a switch, a timer, a motion detector, an ambient object detector, a sound detector, a two-way communicator, an alert indicator, an air quality detector, an intrusion detector, an annunciator, diagnostic electronics, and a thermostat.

An approach for replacing a wallbox device may incorporate providing a mounting frame attachable to a wallbox, providing a first wallbox device attached to the mounting frame and connected to a memory in the mounting frame, and detaching and disconnecting the first wallbox device from the mounting frame and the memory in the mounting frame, and attaching and connecting a second wallbox device to the mounting frame and the memory in the mounting frame. The second wallbox device may have the same structure and electronics as the first wallbox device.

The memory may incorporate a configuration developed for a wallbox device like the first and second wallbox devices. The memory may incorporate a first connection interface. The first wallbox device may incorporate a second connection interface. A second wallbox device may incorporate a second connection interface. Attaching the first and second connection interfaces to each other may result in a connection between the first connection interface and the second connection interface.

A connection between the first and second connection interfaces may be selected from a group consisting of a near field communication connection, an RFID connection, an optical connection, and a wire connection.

The first and second wallbox devices may incorporate one or more items selected from a group consisting of a switch, a timer, a motion detector, an ambient object detector, a sound detector, a two-way communicator, an alert indicator, an air quality detector, an intrusion detector, an annunciator, diagnostic electronics, and a thermostat.

The memory may incorporate a trusted platform module. The trusted platform module may provide for secure storage of various settings besides the configuration developed for a wallbox device. When the second wallbox device is mounted to the mounting frame and connected to the memory, the second wallbox device may announce itself to a network with a default key to request permission to join the network. A network member or server may send a challenge to the second wallbox device that is or needs to be met through accessing the trusted platform module. The trusted platform module may contain a hash function that computes a reply to the challenge. If there is lack of a challenge or there is an acceptable reply to the challenge, then the second wallbox device may become a network member.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A wall-mountable electronic system comprising:
a wall-mountable electronic device comprising:
 a user interface; and
 a processor connected to the user interface; and
a mounting frame comprising a memory having configuration settings for the wall-mountable electronic device; and
wherein:
the wall-mountable electronic device is attached to the mounting frame and connected to the memory;
the wall-mountable electronic device is configured to be detached from the mounting frame and disconnected from the memory;
when the wall-mountable electronic device is detached from the mounting frame and disconnected from the memory, then another wall-mountable electronic device can be attached to the mounting frame and connected to the memory; and
the configuration settings stored in the memory are applicable to the other wall-mountable electronic device.

2. The system of claim 1, wherein the memory comprises a trusted platform module that allows for secure storage of configuration settings that incorporate particular encryption keys and/or authentication information.

3. The system of claim 1, wherein the wall-mountable electronic device comprises one or more items selected from a group consisting of a switch, a timer, a motion detector, an ambient object detector, a sound detector, a two-way communicator, an alert indicator, an air quality detector, an intrusion detector, an annunciator, diagnostic electronics, and a thermostat.

4. The system of claim 1, wherein the memory further has energy management settings and network configuration settings.

5. The system of claim 1, wherein the memory further has application-level settings which allow the wall-mountable electronic device to participate in an overall building automation control.

6. The system of claim 1, wherein a connection occurs between the wall-mountable electronic device and the mounting frame having contacts connected to the memory and exposed towards contacts of the wall-mountable electronic device with contact between the contacts of the mounting frame and the contacts of the wall-mountable electronic device.

7. The system of claim 1, wherein a connection between the wall-mountable electronic device and the memory of the mounting frame comprises exposed metal connection pads on a printed circuit board holding the memory, and the wall-mountable electronic device comprises pogo pins to establish contact with the pads when the wall-mountable electronic device is attached to the mounting frame.

8. The system of claim 1, wherein a connection between the wall-mountable electronic device and the memory of the mounting frame comprises a wireless transmitter and a reader.

9. The system of claim 2, wherein:
the trusted platform module provides for secure storage of various settings besides configuration settings; and
when the other wall-mountable electronic device is mounted to the mounting frame and connected to the memory, the other wall-mountable electronic device can announce itself to a network with a default key to request permission to join the network.

10. The system of claim 9, wherein:
a network member or server can send a challenge to the other wall-mountable electronic device that is or needs to be met through accessing the trusted platform module;
the trusted platform module contains a hash function that computes a reply to the challenge; and
if there is lack of a challenge or there is an acceptable reply to the challenge, then the other wall-mountable electronic device becomes a network member.

11. The system of claim 1, wherein the mounting frame is attachable to and removable from a commercially present or available standard or conventional wallbox without modification of the wallbox.

12. An electronic device arrangement comprising:
a mounting frame attachable to a wall;
a memory attached to the mounting frame; and
an electronic device having a user interface and a processor connected to the user interface, the electronic device attachable to and detachable from the mounting frame, and connectable to and dis-connectable from the memory, respectively; and
wherein the electronic device is replaceable with another similar electronic device that is attachable to the mounting frame and connectable to the memory in a similar manner as the replaced electronic device.

13. The arrangement of claim 12, wherein:
- the processor of the electronic device is connectable to the memory and the electronic device, along with the user interface and processor, is replaceable with another electronic device with a user interface and processor; and
- configuration settings held by the memory are applicable for the processor and user interface of the replaced electronic device and the other electronic device.

14. The arrangement of claim 13, wherein a connection, between the processor of the electronic device and the memory, comprises contacts on the memory and on the processor of the electronic device.

15. The arrangement of claim 13, wherein:
- the memory comprises a trusted platform sub-module;
- the trusted platform sub-module can securely hold configuration settings for the processor and user interface; and
- the trusted platform module stores security configuration settings comprising network encryption keys and/or authentication information.

16. The arrangement of claim 13, wherein a connection between the memory and the processor is selected from a group consisting of near field communication (NFC), infrared communication, near optical communication, and optical fiber communication.

17. The arrangement of claim 12, wherein the electronic device comprises one or more items selected from a group consisting of a switch, a timer, a motion detector, an ambient object detector, a sound detector, a two-way communicator, an alert indicator, an air quality detector, an intrusion detector, an annunciator, diagnostic electronics, and a thermostat.

18. The arrangement of claim 12, wherein the mounting frame is attached to a wall via a commercially present or available standard or conventional wallbox without modification of the wallbox.

19. A method for replacing a wall-mountable electronic device comprising:
- providing a mounting frame having a memory therein;
- providing a first wall-mountable electronic device having a first user interface and a first processor in communication with the first user interface, the first wall-mountable electronic device attached to the mounting frame and connected to the memory in the mounting frame;
- detaching and disconnecting the first wall-mountable electronic device from the mounting frame and the memory in the mounting frame; and
- attaching and connecting a second wall-mountable electronic device having a second user interface and a second processor in communication with the second user interface, the second wall-mountable electronic device to the mounting frame and the memory in the mounting frame; and
- wherein the second wall-mountable electronic device has the same structure and electronics as the first wall-mountable electronic device.

20. The method of claim 19, wherein the first and second wall-mountable electronic devices comprise one or more items selected from a group consisting of a switch, a timer, a motion detector, an ambient object detector, a sound detector, a two-way communicator, an alert indicator, an air quality detector, an intrusion detector, an annunciator, diagnostic electronics, and a thermostat.

* * * * *